United States Patent
Gin et al.

(10) Patent No.: US 11,473,355 B2
(45) Date of Patent: Oct. 18, 2022

(54) PRESS-TO-DEPLOY ROTATABLE LATCH ASSEMBLY

(71) Applicant: The Boeing Company, Chicago, IL (US)

(72) Inventors: Ashley Gin, Fremont, CA (US); Harold G. Erickson, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 260 days.

(21) Appl. No.: 16/835,088

(22) Filed: Mar. 30, 2020

(65) Prior Publication Data
US 2021/0301570 A1  Sep. 30, 2021

(51) Int. Cl.
*E05C 19/02* (2006.01)
*E05C 5/04* (2006.01)
(Continued)

(52) U.S. Cl.
CPC .............. *E05C 19/022* (2013.01); *E05B 9/02* (2013.01); *E05C 5/04* (2013.01); *E05C 17/02* (2013.01);
(Continued)

(58) Field of Classification Search
CPC ......... Y10T 292/0864; Y10T 292/0863; Y10T 292/0867; Y10T 292/0868; Y10T 292/0869; Y10T 292/0886; Y10T 292/0887; Y10T 292/0889; Y10T 292/0891; Y10T 292/0893; Y10T 292/20; Y10T 292/202; Y10T 292/225; Y10T 292/228; Y10T 292/34; Y10T 292/37; Y10T 292/373; Y10T 292/379; Y10T 292/388; Y10T 292/391; Y10T 292/394;
(Continued)

(56) References Cited

U.S. PATENT DOCUMENTS 2,981,560 A * 4/1961 Alfred .................. E05B 13/002
                                                   292/207
3,288,115 A   11/1966 Hechtle
(Continued)

FOREIGN PATENT DOCUMENTS

DE   202004020295 U1 * 3/2005 ............. E05C 17/46
DE   202004020295 U1 * 4/2005 ............. E05C 17/46
(Continued)

*Primary Examiner* — Kristina R Fulton
*Assistant Examiner* — Steven A Tullia
(74) *Attorney, Agent, or Firm* — Alleman Hall Creasman & Tuttle LLP

(57) ABSTRACT

A latch assembly is provided that includes a latch arm having a rotational axis and an engagement surface on a distal end of the latch arm a length from the rotational axis. The engagement surface is stowed in a stowed state of the latch arm. The latch arm is configured to receive a pushing force to depress the latch arm a predetermined distance along the rotational axis. The latch assembly also includes a turret assembly having a top end with the latch arm mounted thereon. The turret assembly is configured to, in response to the pushing force being applied to the latch arm, raise and rotate the latch arm about the rotational axis to thereby transition the latch arm from the stowed state to a deployed state in which the engagement surface is exposed.

20 Claims, 9 Drawing Sheets

(51) Int. Cl.
*E05B 9/02* (2006.01)
*E05C 17/02* (2006.01)

(52) U.S. Cl.
CPC ... *E05Y 2900/502* (2013.01); *E05Y 2900/531* (2013.01); *E05Y 2900/55* (2013.01)

(58) Field of Classification Search
CPC ..... Y10T 292/397; E05C 19/022; E05C 5/04; E05C 19/02; E05C 19/028; E05C 5/00; E05C 5/02; E05C 17/00; E05C 17/02; E05C 17/04; E05C 17/047; E05C 17/46; E05C 17/48; E05C 17/50; E05C 17/54; E05B 9/02; E05Y 2900/502; E05Y 2900/531; E05Y 2900/55; Y10S 292/04; Y10S 292/15; Y10S 292/30; B64D 11/0638; B64D 11/003; B60N 3/001; B60N 3/002; B60N 3/004; A47B 31/00; A47B 31/06
See application file for complete search history.

(56) References Cited

U.S. PATENT DOCUMENTS

| | | | | |
|---|---|---|---|---|
| 5,738,389 A * | 4/1998 | Marks | .................. | E05C 17/166 292/63 |
| 6,874,825 B1 * | 4/2005 | Rauner | .............. | E05B 65/0014 292/175 |
| 8,152,208 B2 * | 4/2012 | Varney | ................... | E05C 3/041 292/227 |
| 8,585,119 B2 * | 11/2013 | Beck | ..................... | B60K 15/05 296/97.22 |
| 8,720,827 B2 * | 5/2014 | Boren | .................... | E06B 3/921 244/129.5 |
| 8,944,377 B2 * | 2/2015 | McIntosh | ............. | B61D 35/005 244/118.5 |
| 9,010,836 B2 * | 4/2015 | Watanabe | ............ | E05C 19/022 296/97.22 |
| 9,493,967 B2 * | 11/2016 | Basavarajappa | ........ | E05B 83/34 |
| 9,950,615 B2 * | 4/2018 | Horikawa | ............. | E05C 19/022 |
| 2007/0247042 A1 * | 10/2007 | Yuhara | .................. | B65D 11/12 312/330.1 |
| 2009/0065641 A1 * | 3/2009 | Koehn | ............... | B64D 45/0028 244/118.5 |
| 2012/0167472 A1 * | 7/2012 | Taniguchi | .............. | B60K 15/05 49/386 |
| 2014/0030015 A1 * | 1/2014 | Beck | ...................... | B60K 15/04 403/349 |
| 2014/0251036 A1 * | 9/2014 | Ishiguro | .................. | E05C 19/02 74/55 |
| 2015/0300055 A1 * | 10/2015 | Alexander | ............ | E05C 19/022 292/200 |
| 2016/0039349 A1 * | 2/2016 | Casagrande | ........... | B60R 7/043 248/205.1 |
| 2016/0326780 A1 * | 11/2016 | Watanabe | ............... | E05B 83/34 |
| 2017/0043857 A1 * | 2/2017 | Seibt | .................... | B64C 1/1423 |
| 2017/0362863 A1 * | 12/2017 | Sridhar | ................. | E05B 83/34 |
| 2019/0093392 A1 * | 3/2019 | Schwab | .................... | E05B 81/90 |
| 2019/0119960 A1 * | 4/2019 | Betzen | .................... | E05B 83/34 |
| 2019/0283881 A1 * | 9/2019 | Colletti | .................. | B60N 3/004 |

FOREIGN PATENT DOCUMENTS

| | | | | |
|---|---|---|---|---|
| DE | 102013008142 A1 * | 11/2014 | ........... | E05C 19/022 |
| DE | 102016103825 A1 * | 9/2017 | ............... | B64C 1/06 |
| EP | 3269589 A1 * | 1/2018 | ............ | B60N 2/753 |
| FR | 2998224 A1 * | 5/2014 | ............. | B60K 15/05 |
| NL | 1028465 C2 * | 9/2006 | ............. | A47B 31/00 |
| WO | WO-2020007737 A1 * | 1/2020 | ........ | B60K 15/0406 |

* cited by examiner

PRESS-TO-DEPLOY ROTATABLE LATCH ASSEMBLY

FIELD

The present disclosure relates generally to mechanical engineering, and more specifically, to the structural design of interior panels for aircraft and other transportation vehicles.

BACKGROUND

In transportation vehicles such as aircraft which require energy to transport occupants or cargo, space and weight can be conserved by allowing various interior panels and furnishings to convert form with mechanical solutions such as fold-out tables, hidden closets, and view windows in walls. Due to safety concerns for the occupants during normal or abnormal movement of the vehicle, items such as fold-out furniture and panels should be securely held in place, whether folded out or stowed away. To this end, mechanical fixtures may be provided to securely hold such items in place. The design of these mechanical fixtures presents many challenges, including securely holding the items during deployment, maintaining a safe profile while stowed and deployed, and promoting ease of use during stowage and deployment.

One conventional solution to secure a fold-out panel is a latch including a slide bar that inserts into a hole in the fold-out panel. However, this requires machining the hole in the fold-out panel and lining up the slide bar with the hole, which can be difficult to do accurately. Another conventional solution is an embedded clamp which opens while a user pushes down on one end of the clamp and closes when released. However, in order to open the clamp wide enough to insert the panel, the user may need to insert their finger into the recess accommodating the clamp, which can be a tight and uncomfortable fit, and may even pinch. Because the user must keep the clamp open while opening and positioning the fold-out panel into the clamp, the user likely only has one hand available for the positioning task. Further, opening the clamp and positioning the panel can be difficult for the user because a portion of the clamp is located underneath the open panel if the clamp is not opened wide enough before the panel is opened.

SUMMARY

To address the above issues, according to one aspect of the present disclosure, a latch assembly is provided herein. In this aspect, the latch assembly includes a latch arm having a rotational axis and an engagement surface on a distal end of the latch arm a length from the rotational axis. The engagement surface is stowed in a stowed state of the latch arm. The latch arm is configured to receive a pushing force to depress the latch arm a predetermined distance along the rotational axis. The latch assembly also includes a turret assembly having a top end with the latch arm mounted thereon. The turret assembly is configured to, in response to the pushing force being applied to the latch arm, raise and rotate the latch arm about the rotational axis to thereby transition the latch arm from the stowed state to a deployed state in which the engagement surface is exposed.

Another aspect of the present disclosure relates to an aircraft component latching system. In this aspect, the latching system includes an openable aircraft component mounted in an aircraft panel, and a latch assembly embedded into the aircraft panel. The latch assembly includes a latch arm having a rotational axis and an engagement surface on a distal end of the latch arm that is stowed in the aircraft panel in a stowed state of the latch arm. The latch arm is configured to receive a pushing force to depress the latch arm a predetermined distance, where the pushing force is a downward force into the aircraft panel parallel to the rotational axis. The latch assembly also includes a turret assembly having a top end with the latch arm mounted thereon. The turret assembly is configured to, in response to the pushing force being applied to the latch arm, raise and rotate the latch arm about the rotational axis to thereby transition the latch arm from the stowed state to a deployed state in which the engagement surface is exposed. The engagement surface is configured to hold the aircraft component in place when the latch arm is in the deployed state.

Still another aspect of the present disclosure relates to a method of assembling a latch assembly. In this aspect, the method includes assembling a turret assembly by nesting a first cartridge, a second cartridge inside the first cartridge, and third cartridge inside the second cartridge. The method includes mounting the turret assembly in a housing, and positioning a first spring underneath the third cartridge to provide an upward force. The method includes connecting a second spring to the housing and the first cartridge to provide a rotational force about a rotational axis. The method includes fixedly attaching a latch arm to the second cartridge, the latch arm being configured to receive a pushing force in a stowed state to be depressed a predetermined distance along the rotational axis, then rotate about the rotational axis and rise to thereby transition to a deployed state.

The features, functions, and advantages that have been discussed can be achieved independently in various embodiments or may be combined in yet other embodiments, further details of which can be seen with reference to the following description and drawings.

DETAILED DESCRIPTION

Figure 1:
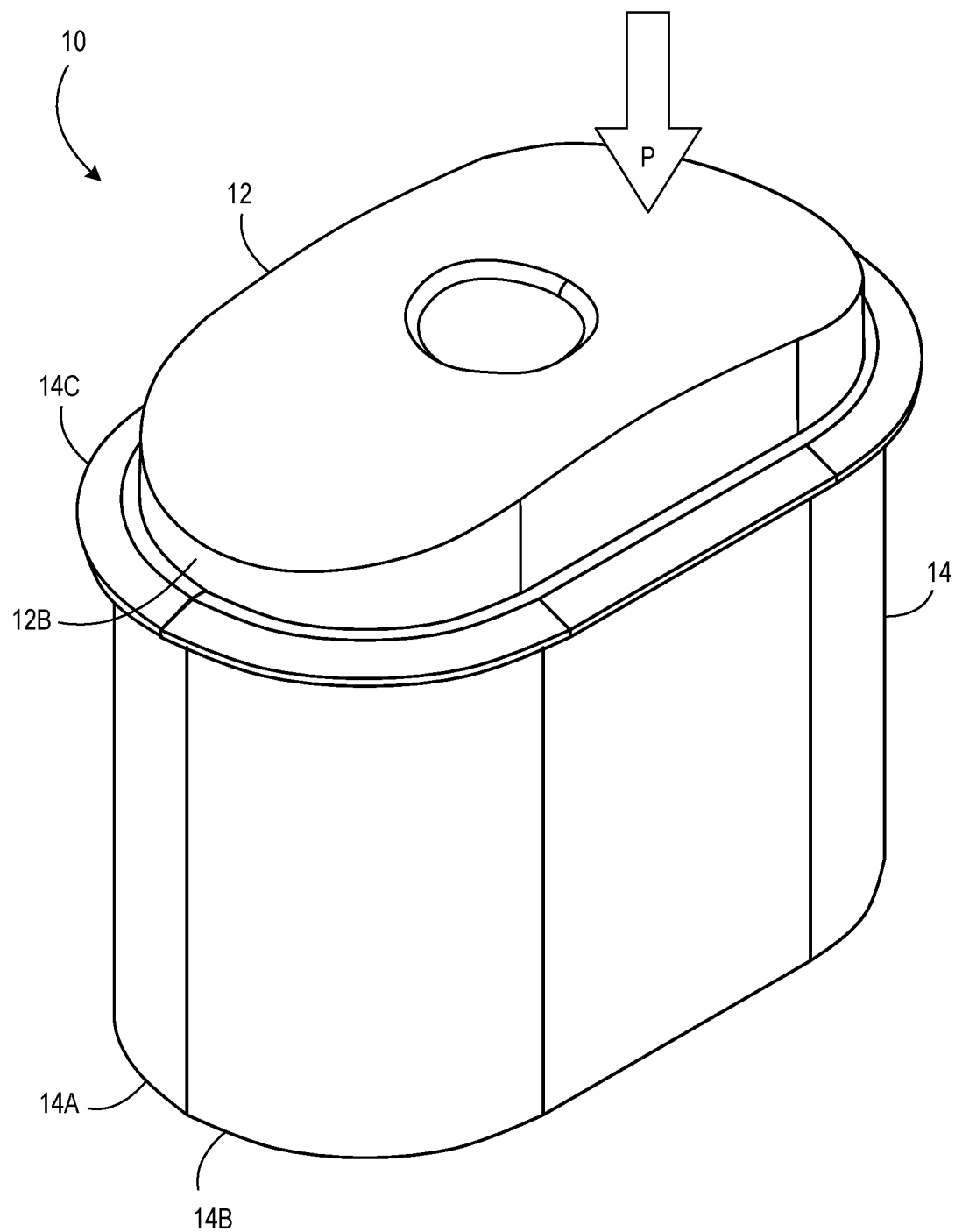
FIG. 1 shows a latch assembly according to the present disclosure in a stowed state.
Figure 2:
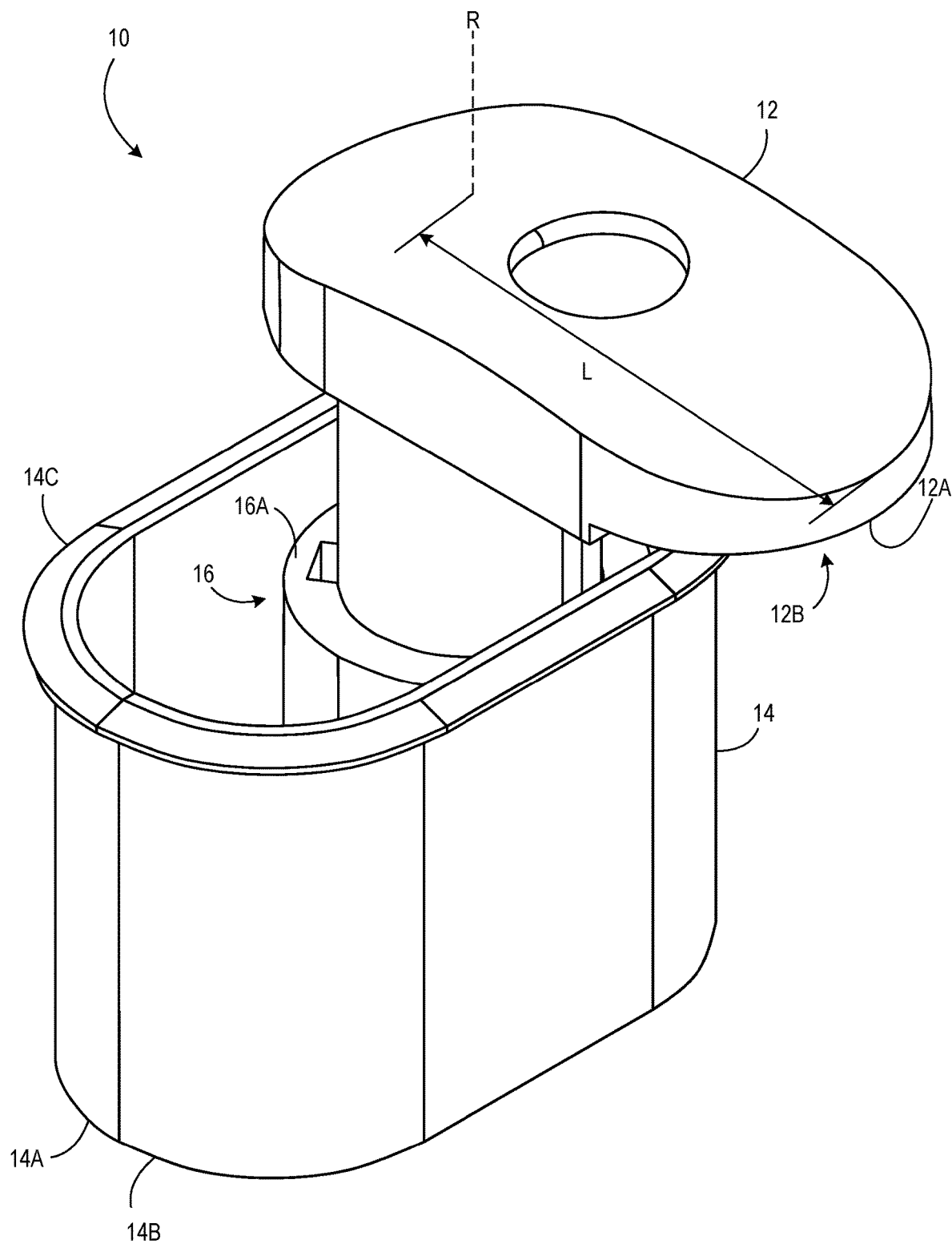
FIG. 2 shows the latch assembly of FIG. 1 in a deployed state.

FIG. 1 shows a latch assembly 10 according to the present disclosure in a stowed state, and FIG. 2 shows the latch assembly 10 in a deployed state. In the depicted embodiment, the latch assembly 10 includes a latch arm 12 having a rotational axis R and an engagement surface 12A on a distal end 12B of the latch arm 12. The distal end 12B extends a length L from the rotational axis R. The engagement surface 12A is configured to be stowed relative to a surrounding structure, such as housing 14 described below, in the stowed state of the latch arm 12. In the depicted embodiment, the latch assembly 10 further includes a housing 14 surrounding the latch arm 12 and a turret assembly 16 (described below). The housing 14 may be assembled from multiple parts for ease of manufacturing. For example the housing 14 may include housing section 14A and housing section 14B which are joined together. The housing 14 is configured to restrict rotational movement of the latch arm 12 in the stowed state. The housing 14 includes a lip 14C or other structure to restrict the rotational movement of the latch arm 12, but permit vertical movement. As used herein, directional terms such as "vertical," "up," and "down" refer to the orientation of the latch assembly 10 as shown in FIGS. 1 and 2, where the top of the latch arm 12 is exposed above the housing 14 and the rotational axis R is substantially aligned in the vertical direction. To deploy the latch arm 12 from the stowed state, the latch arm 12 is configured to receive a pushing force P to depress the latch arm 12 a predetermined distance along the rotational axis R. The pushing force P is substantially downward on the top of the latch arm 12.

Figure 3:
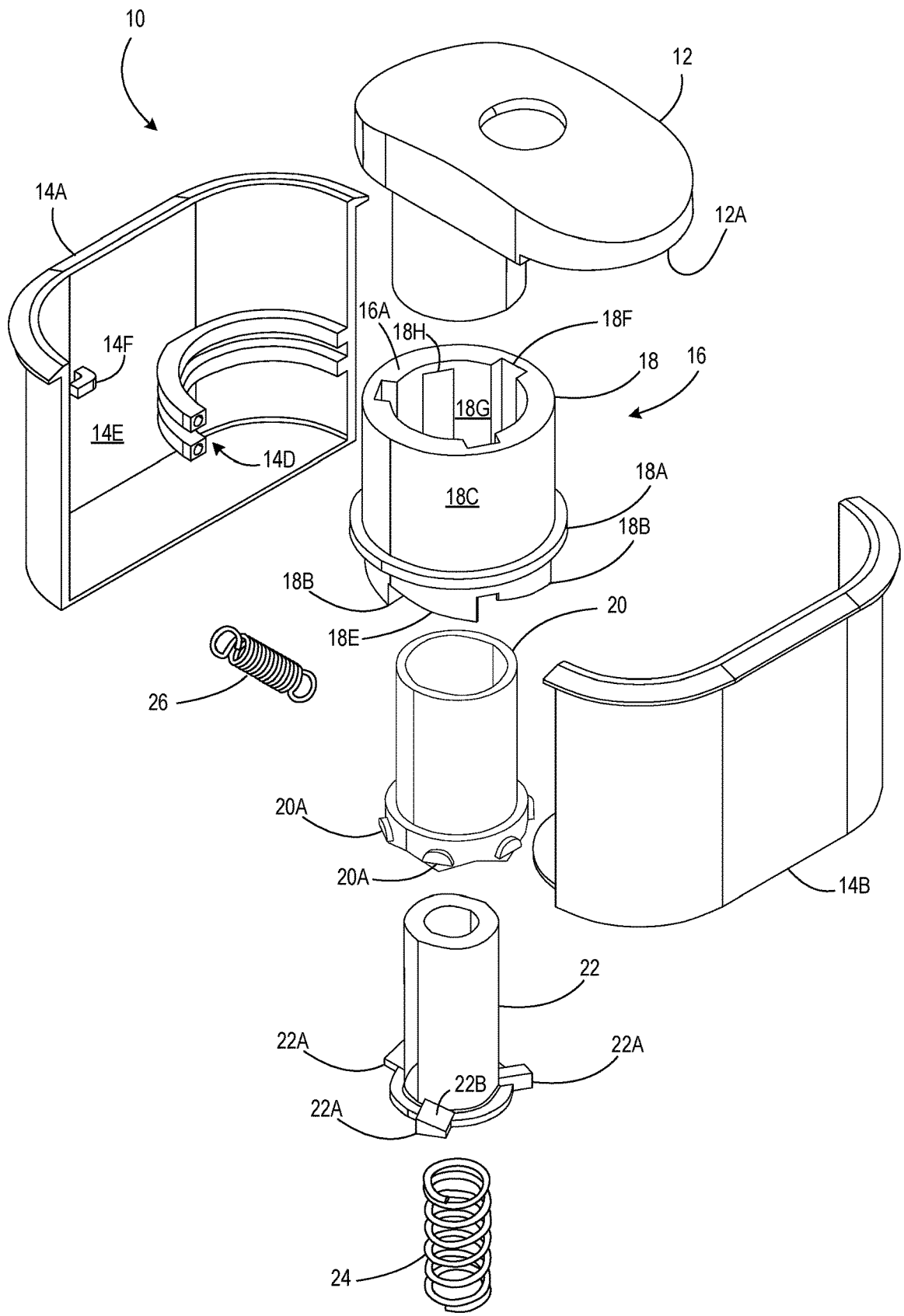
FIG. 3. is an exploded view of the latch assembly of FIG. 1.

The latch assembly 10 further includes a turret assembly 16 having a top end 16A with the latch arm 12 mounted thereon. FIG. 3. is an exploded view of the latch assembly 10, including various components of the turret assembly 16. Briefly, the turret assembly 16 is configured to, in response to the pushing force P being applied to the latch arm 12, raise and rotate the latch arm 12 about the rotational axis R to thereby transition the latch arm 12 from the stowed state to the deployed state in which the engagement surface 12A is exposed. In more detail, the turret assembly 16 includes a first cartridge 18 having a protrusion or recess (here, a band 18A protruding outward) configured to restrict vertical movement and lateral movement and permit rotational movement, about the rotational axis R, of the first cartridge 18. The movement of the first cartridge 18 is restricted by corresponding structural features on the housing 14. In the illustrated example, the housing 14 includes a double shelf 14D configured to retain or sandwich the band 18A therebetween, thereby restricting vertical and lateral movement of the first cartridge 18 when the housing 14 is closed around the turret assembly 16. It will be appreciated that the recess formed to accommodate the band 18A may be between projected parts as illustrated, or recessed into the housing wall itself. Alternatively, if the first cartridge 18 includes the recess instead of the projected band 18A, then the housing 14 may include a single shelf configured to be accommodated into the recess of the first cartridge 18 in the reverse of the manner depicted in FIG. 3.

The turret assembly 16 also includes a second cartridge 20 inserted into the first cartridge 18. The second cartridge 20 is fixedly connected to the latch arm 12. The second cartridge 20 may be manufactured separately from the latch arm 12 and then joined by, for example, press fitting, reverse threading, or mating a protruding shape and recessed shape in a snap-on arrangement, or alternatively may be formed integrally therewith, for example, by an additive manufacturing process such as three dimensional printing. Due to the fixed connection, the latch arm 12 and the second cartridge 20 move together. The turret assembly 16 further includes a third cartridge 22 inserted into the second cartridge 20 and upon which the second cartridge 20 rests. Each cartridge of the turret assembly 16 includes various features that are formed to interact with the features of the other cartridges. For example, in the illustrated embodiment, the third cartridge 22 includes outward-facing teeth 22A, and the first cartridge 18 includes downward-facing teeth 18B configured to engage with the outward-facing teeth 22A of the third cartridge 22, thereby restricting upward movement of the third cartridge 22 when the latch arm 12 is in the stowed state. In addition, the latch assembly 10 includes a first spring 24, such as a compression spring, positioned beneath the third cartridge 22 to provide an upward force. In response to the latch arm 12 receiving the pushing force P while in the stowed state, the latch arm 12 and the second cartridge 20 are configured to move downward and push the third cartridge 22 downward. As explained above, the first spring 24 positioned beneath the third cartridge is configured to be compressed by the third cartridge 22. After moving downward, the outward-facing teeth 22A of the third cartridge 22 are configured to vertically clear the downward-facing teeth 18B of the first cartridge 18. Thus, in order to deploy the latch arm 12 from the stowed state, the latch arm 12 is depressed a predetermined distance corresponding to how far the outward-facing teeth 22A of the third cartridge 22 need to travel from a starting position in order to vertically clear the downward-facing teeth 18B of the first cartridge 18, for example, approximately the height of the of the downward-facing teeth 18B.

The latch assembly 10 also includes a second spring 26, such as an extension spring, connected to an outer surface 18C of the first cartridge 18 via a hook 18D (see FIGS. 4A and 4B), and to an inner surface 14E of the housing 14 via one of the illustrated pair of hooks 14F, to provide a rotational force. It will be appreciated that the latch assembly 10 may be configured to rotate clockwise or counterclockwise during deployment, and thus appreciated that the second spring 26 is illustrated mounted in two different possible positions corresponding to the different hooks 14F, one position to provide biased clockwise rotation and one position to provide biased counter clockwise rotation of the turret assembly 16 and latch arm 12, as explained in greater detail below with reference to FIGS. 4A and 4B. Briefly, in the depicted embodiment the second spring 26 is configured to be compressed in the stowed state and expand to provide bias to rotate the turret assembly 16 and the latch arm 12 in the counterclockwise direction when the latch arm 12 transitions from the stowed state to the deployed state. Once the outward-facing teeth 22A of the third cartridge 22 have moved lower than the downward-facing teeth 18B of the first cartridge 18, the third cartridge 22 is free to rotate in response to the bias force provided by the contraction of the second spring 26.

Figure 4A:
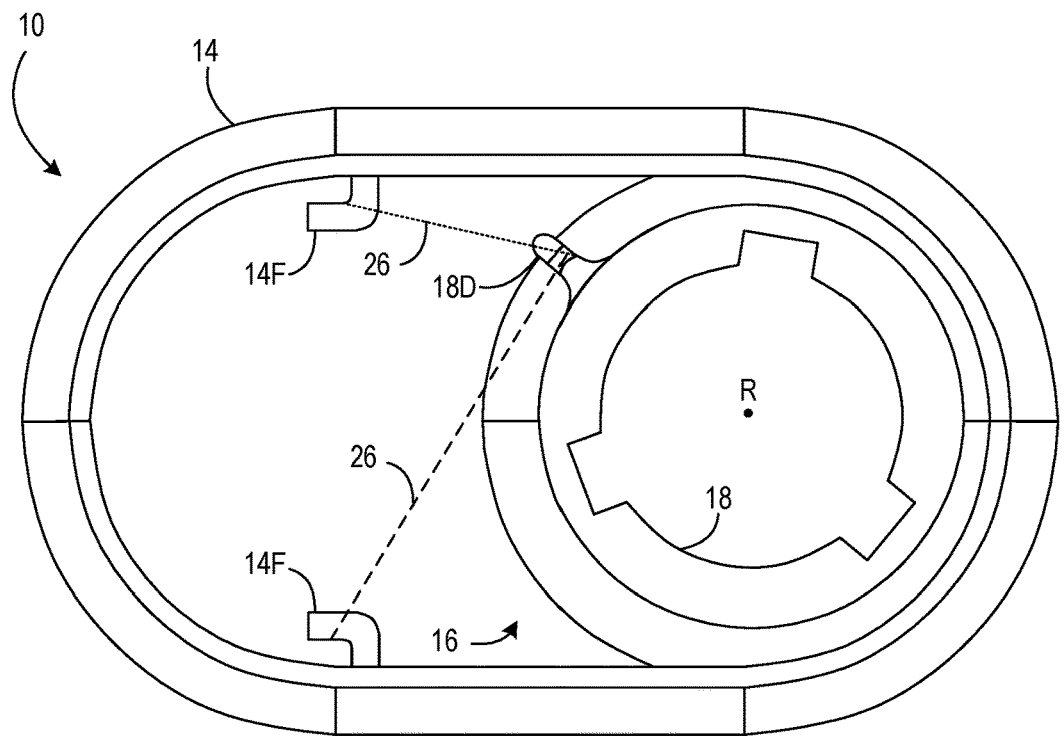
FIGS. 4A and 4B are top views of the latch assembly of FIG. 1 with some components removed.
Figure 4B:
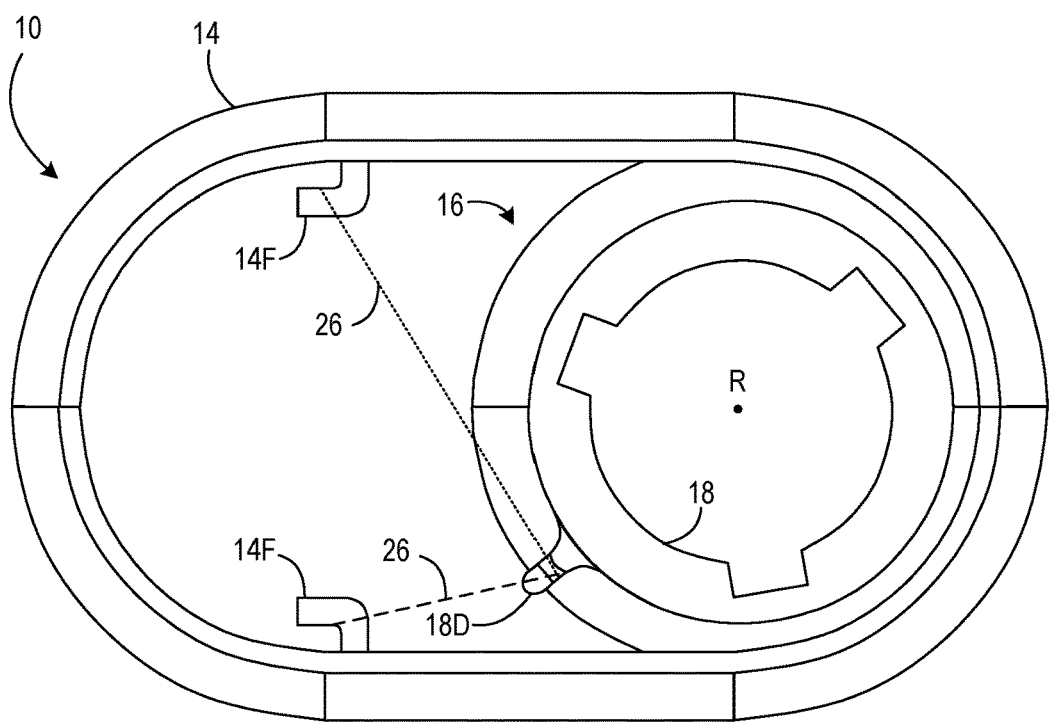

Two example positions for the second spring 26 are illustrated in FIGS. 4A and 4B, via dashed and dotted lines. For simplicity, only the first cartridge 18 is shown in the turret assembly 16 and the latch arm 12 is removed. The dashed lines illustrate counterclockwise rotation during deployment, as in FIGS. 1 and 2, while the dotted lines illustrate clockwise rotation. Accordingly, FIG. 4A is the stowed state and FIG. 4B is the deployed state for the counterclockwise (dashed line) arrangement, while FIG. 4A is the deployed state and FIG. 4B is the stowed state for the clockwise (dotted line) arrangement. For the counterclockwise arrangement, the dashed lines show that the second spring 26 may be attached to one of the hooks 14F in the housing 14 and the hook 18D on the first cartridge 18, in an extended state. That is, the second spring 26 may be pulled taut and held in place by the housing 14 forcing the latch arm 12 to remain rotationally still. After the latch arm receives the pushing force P and then the pushing force P is released, the first spring 24 may push the latch arm 12 and the turret assembly 16 upward, as will be described below in more detail. At this point, the latch arm 12 may be pushed above the housing 14, and thus the latch arm 12 and the turret assembly 16 may become free to rotate about the rotational axis R under a biasing force provided by the second spring 26 as the second spring 26 contracts. The turret assembly 16 ceases rotating when the hook 18D on the first cartridge moves to a position closest to the hook 14F in the housing 14 such that the second spring 26 is in a contracted state, where further rotation would require extension of the second spring 26. After deployment, the second spring 26 is extended again when the user applies a second downward force and manually rotates the latch arm 12 in the opposite direction as during deployment. For the clockwise arrangement, the dotted lines show the same deployment procedure, from FIG. 4B to FIG. 4A.

Figure 5A:
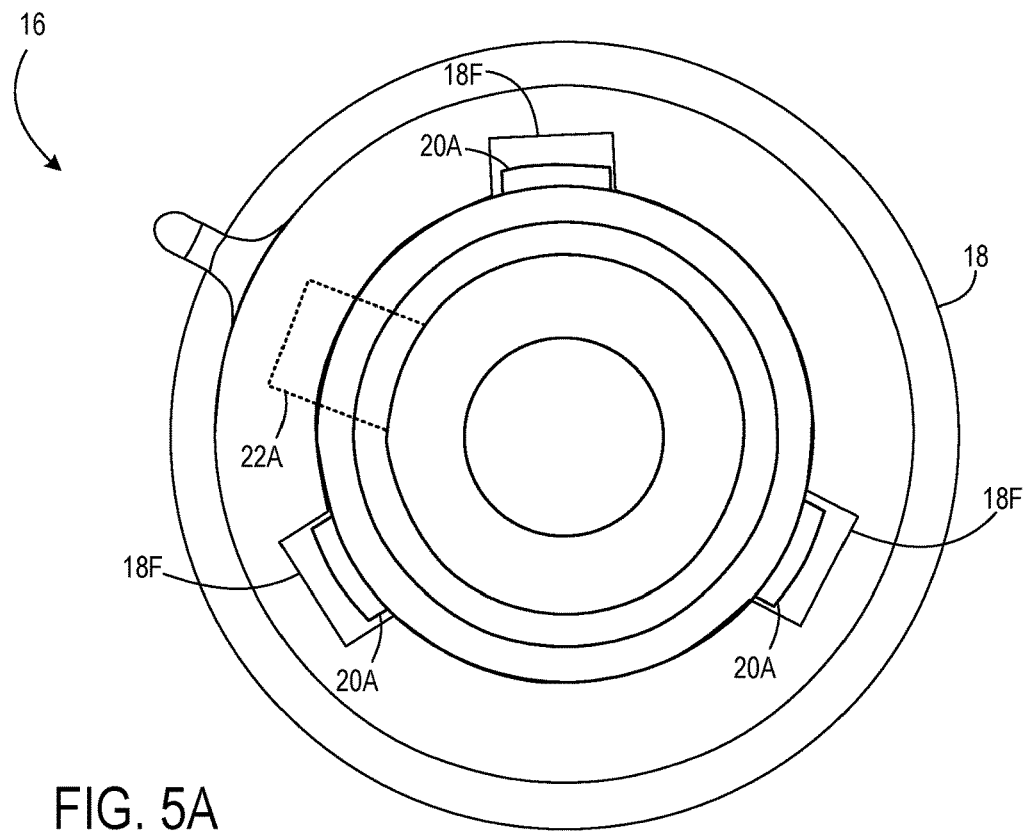
FIG. 5A is a top view of a turret assembly of the latch assembly of FIG. 1, in the stowed state.
Figure 5B:
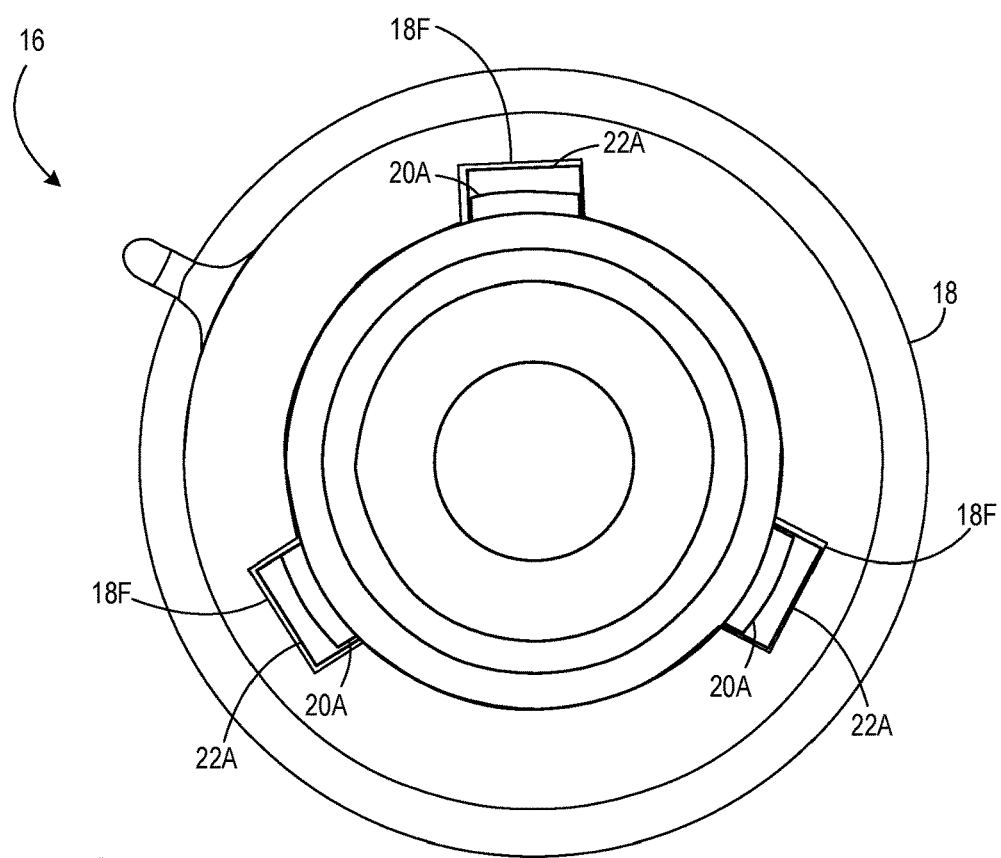
FIG. 5B is a top view of a turret assembly of the latch assembly of FIG. 1, in the deployed state.

FIG. 5A shows a top view of the turret assembly 16 in the stowed state, and FIG. 5B shows the turret assembly 16 in the deployed state. In the stowed state, the outward-facing teeth 22A of the third cartridge 22 are blocked from moving upward by the downward-facing teeth 18B of the first cartridge 18. One of the outward-facing teeth 22A of the third cartridge 22 is shown in dashed lines for reference in FIG. 5A. However, in response to the pushing force P being released, the first spring 24 is configured to expand while the outward-facing teeth 22A of the third cartridge 22 move along slopes 18E (see FIG. 3) of the downward-facing teeth 18B of the first cartridge 18, thereby raising and rotating the third cartridge 22 about the rotational axis R. The tops of the outward-facing teeth 22A of the third cartridge 22 have corresponding slopes 22B to facilitate sliding. After the outward-facing teeth 22A are guided along the slopes 18E, the outward-facing teeth 22A of the third cartridge 22 are configured to enter first vertical slots 18F on an inner surface 18G of the first cartridge 18 which allow the third cartridge 22 to continue to rise as the first spring 24 further expands, as shown in FIG. 5B. Once aligned, the third cartridge 22 are configured to push up the second cartridge 20 with outward-facing teeth 20A of the second cartridge 20 engaging second vertical slots 18H of the first cartridge 18.

In the depicted example, the third cartridge 22 includes three outward-facing teeth 22A and the first cartridge 18 includes three first vertical slots 18F, while the second cartridge 20 includes six outward-facing teeth 20A, three of which engage the first vertical slots 18F together with the outward-facing teeth 22A, and three of which engage the second vertical slots 18H. Alternatively, any suitable number of teeth and slots may be adopted. As can be seen in FIG. 3, the first vertical slots 18F are radially deep compared to the shallower second vertical slots 18H, and are taller as well. Accordingly, the teeth 20A of the second cartridge 20 are stopped at the top of the second vertical slots 18H, which in turn stops the third cartridge 22 from being pushed out of the turret assembly 16 by the first spring 24. In this manner, the second cartridge 20 pushes up the latch arm 12 into the deployed state.

Figure 6A:
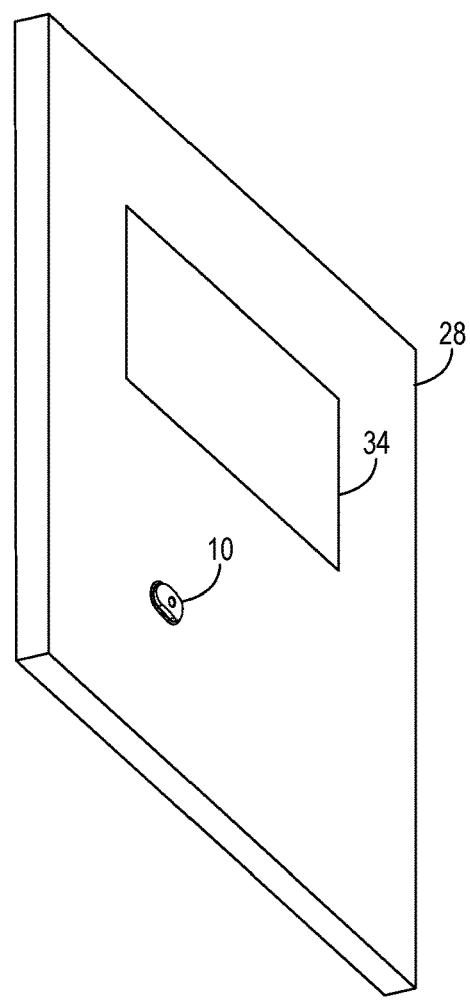
FIGS. 6A and 6B show a panel embedded with the latch assembly of FIG. 1.
Figure 6B:
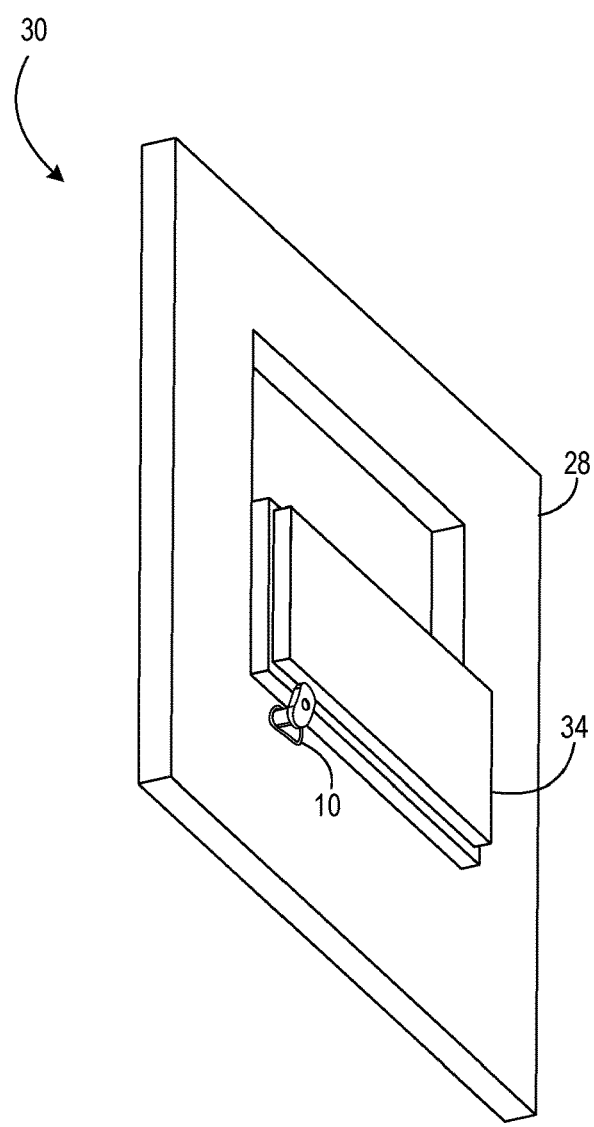

As shown in FIGS. 6A and 6B, the latch assembly 10 is embedded into a panel 28. The housing 14 may be inserted into the panel 28, or the housing 14 may be integral with the panel 28. In either case, the latch arm 12 is substantially flush with the panel 28 in the stowed state. Reducing the amount by which the latch arm 12 protrudes from the housing 14 and the panel 28 has the benefit of reducing the risk of head strike and improving aesthetic appearance. The term "substantially flush" includes a slight projection above the panel, which may allow the user to more easily locate the latch assembly 10 by touch, as long as the protrusion does not reach the extent of a head strike hazard. Alternatively, the latch assembly 10 may be slightly recessed within the panel 28, and still be considered "substantially flush."

Figure 7A:
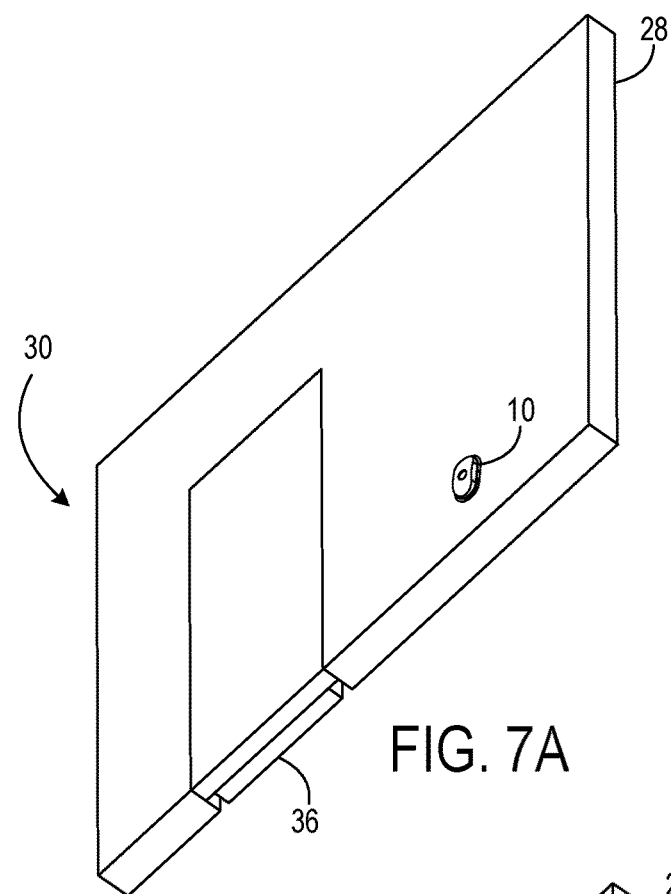
FIGS. 7A and 7B show a door panel embedded with the latch assembly of FIG. 1.
Figure 7B:
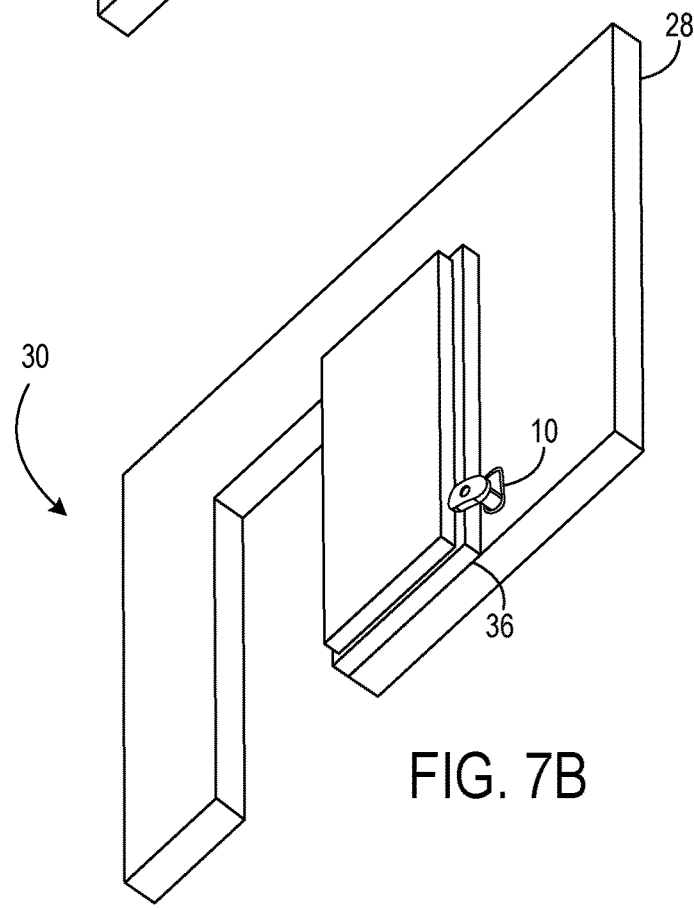
Figure 9:
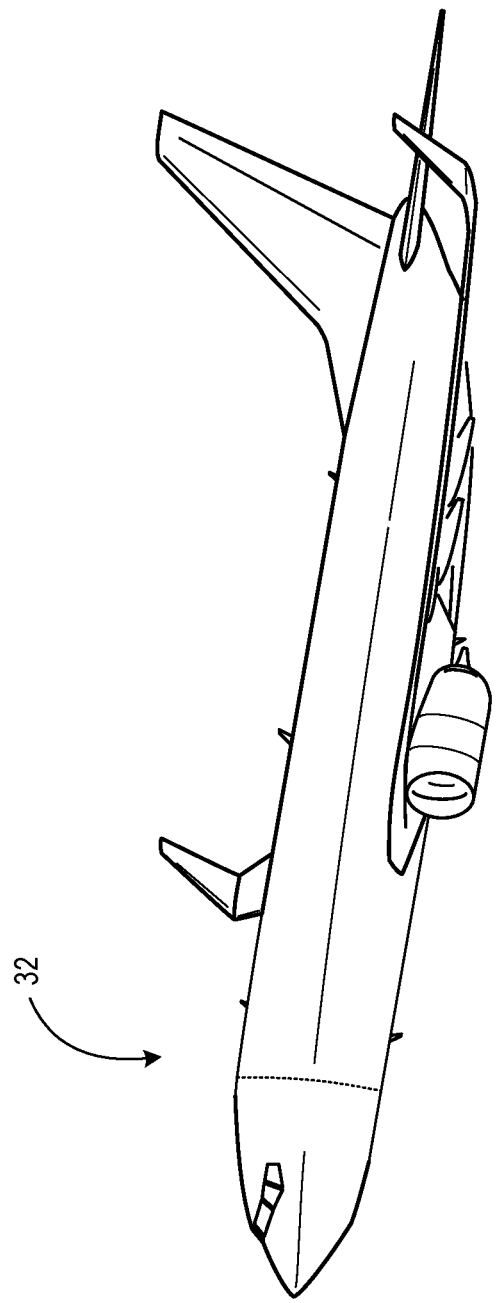
FIG. 9 illustrates an aircraft in which the latch assembly of FIG. 1 may be utilized, according to one example configuration.

The panel 28 in FIGS. 6A and 6B may be included in an aircraft component latching system 30 used in an aircraft 32 (see FIG. 9). In one example, the latch assembly 10 is embedded into an aircraft panel (e.g., the panel 28) having an openable aircraft component 34. After the stowed latch assembly 10 is activated with the pushing force P, the latch arm 12 is deployed with the engagement surface 12A positioned on an underside of the distal end 12B of the latch arm 12. The engagement surface 12A is configured to hold the aircraft component 34 in place when the latch arm 12 is in the deployed state, as shown in FIG. 6B. As can be seen in FIGS. 6A and 6B, the aircraft component 34 may be an internal window panel and the engagement surface 12A may be configured to hold the internal window panel in an open position, for instance, for crew visibility during takeoff and landing. In the example shown in FIGS. 7A and 7B, the aircraft component 34 may be a door 36, such as a galley, closet, or bathroom door. In addition to aircraft panels, the latch assembly 10 and panel 28 may be utilized in various transportation vehicles such as trains, busses, marine vessels, automobiles, etc. Furthermore, only one latch assembly 10 may be included, or two or more may be used to hold the aircraft component 34.

The various components of the latch assembly 10, aside from the first and second springs 24, 26, may be made from a variety of suitable materials. For example, they may be machined from a metal such as aluminum. In another example, they may be plastic, which may be injection molded or additively manufactured.

Figure 8:
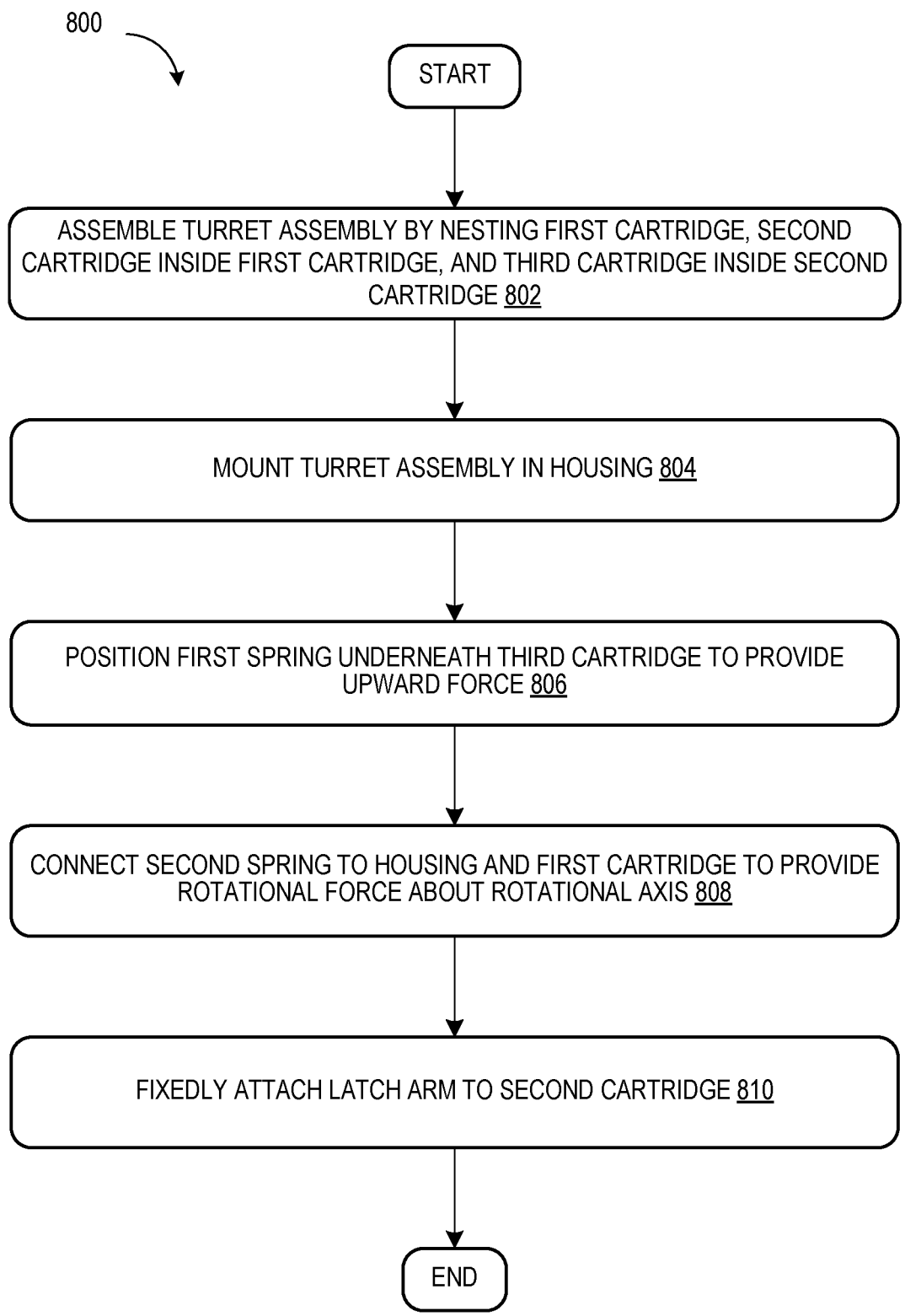
FIG. 8 is a flowchart of a method of assembling a latch assembly.

FIG. 8 is a flowchart of a method 800 of assembling a latch assembly. The following description of method 800 is provided with reference to the latch assembly 10 described above and shown in FIGS. 1-4B. It will be appreciated that method 800 may also be performed in other contexts using other suitable components.

With reference to FIG. 8, at 802, the method 800 includes assembling a turret assembly by nesting a first cartridge, a second cartridge inside the first cartridge, and third cartridge inside the second cartridge. Examples of the cartridges are shown in the exploded view of FIG. 3, which may interact with one another with various protruding or cutout features. At 804, the method 800 includes mounting the turret assembly in a housing. The housing may be one piece and may be formed integrally with a panel into which the latch assembly will be embedded, or the housing may be formed in two or more pieces to be assembled together. At 806, the method 800 includes positioning a first spring underneath the third cartridge to provide an upward force. As discussed above, the first spring may be a compression spring. At 808, the method 800 includes connecting a second spring to the housing and the first cartridge to provide a rotational force about a rotational axis. As discussed above, the second spring may be an extension spring. At 810, the method 800 includes fixedly attaching a latch arm to the second cartridge. The latch arm is configured to receive a pushing force P in a stowed state to be depressed a predetermined distance along the rotational axis, then rotate about the rotational axis and rise to thereby transition to a deployed state. As discussed above, the latch arm is configured to rotate about the rotational axis due to a force from the second spring, and rise upward due to a force from the first spring.

The following paragraphs provide additional support for the claims of the subject application. One aspect provides a latch assembly. The latch assembly includes a latch arm having a rotational axis and an engagement surface on a distal end of the latch arm a length from the rotational axis, the engagement surface being stowed relative to a surrounding structure in a stowed state of the latch arm, the latch arm being configured to receive a pushing force to depress the latch arm a predetermined distance along the rotational axis. The latch assembly includes a turret assembly having a top end with the latch arm mounted thereon, the turret assembly being configured to, in response to the pushing force being applied to the latch arm, raise and rotate the latch arm about the rotational axis to thereby transition the latch arm from the stowed state to a deployed state in which the engagement surface is exposed. In this aspect, additionally or alternatively, the turret assembly includes a first cartridge having a protrusion configured to restrict vertical movement and lateral movement and permit rotational movement, about the rotational axis, of the first cartridge. In this aspect, additionally or alternatively, the turret assembly includes a first cartridge and second cartridge inserted into the first cartridge, the second cartridge being fixedly connected to the latch arm. In this aspect, additionally or alternatively, the turret assembly includes a first cartridge, a second cartridge inserted into the first cartridge, and a third cartridge inserted into the second cartridge and upon which the second cartridge rests, the third cartridge having outward-facing teeth. The first cartridge includes downward-facing teeth configured to engage with the outward-facing teeth of the third cartridge, thereby restricting upward movement of the third cartridge when the latch arm is in the stowed state. In this aspect, additionally or alternatively, in response to the latch arm receiving the pushing force while in the stowed state, the latch arm and a second cartridge are configured to move downward and push a third cartridge downward, a first spring positioned beneath the third cartridge is configured to be compressed by the third cartridge, and outward-facing teeth of the third cartridge are configured to vertically clear downward-facing teeth of a first cartridge. In this aspect, additionally or alternatively, in response to the pushing force being released, a first spring is configured to expand while outward-facing teeth of a third cartridge move along slopes of downward-facing teeth of a first cartridge, thereby raising and rotating the third cartridge about a rotational axis, the outward-facing teeth of the third cartridge are configured to enter first vertical slots on an inner surface of the first cartridge which allow the third cartridge to continue to rise as the first spring further expands, and the third cartridge is configured to push up a second cartridge with outward-facing teeth of the second cartridge engaging second vertical slots of the first cartridge, the second cartridge pushing up the latch arm. In this aspect, additionally or alternatively, the latch assembly further comprises a spring connected to an outer surface of a first cartridge, the spring configured to be compressed in the stowed state and expand to rotate the turret assembly and the latch arm when the latch arm transitions from the stowed state to the deployed state. In this aspect, additionally or alternatively, the latch assembly further comprises a housing surrounding the latch arm and the turret assembly, the housing configured to restrict rotational movement of the latch arm in the stowed state. In this aspect, additionally or alternatively, the housing is integral with a panel, the latch assembly embedded into the panel, and the latch arm is substantially flush with the panel in the stowed state. In this aspect, additionally or alternatively, the engagement surface is positioned on an underside of the distal end of the latch arm. In this aspect, additionally or alternatively, the latch assembly is embedded into an aircraft panel having an openable aircraft component, and the engagement surface is configured to hold the aircraft component in place when the latch arm is in the deployed state. In this aspect, additionally or alternatively, the aircraft component is an internal window panel and the engagement surface is configured to hold the internal window panel in an open position. In this aspect, additionally or alternatively, the aircraft component is a door.

Another aspect provides an aircraft component latching system. The aircraft component latching system includes an openable aircraft component mounted in an aircraft panel, and a latch assembly embedded into the aircraft panel. The latch assembly includes a latch arm having a rotational axis and an engagement surface on a distal end of the latch arm that is stowed in the aircraft panel in a stowed state of the latch arm, the latch arm being configured to receive a pushing force to depress the latch arm a predetermined distance, the pushing force being a downward force into the aircraft panel parallel to the rotational axis, and a turret assembly having a top end with the latch arm mounted thereon, the turret assembly being configured to, in response to the pushing force being applied to the latch arm, raise and rotate the latch arm about the rotational axis to thereby transition the latch arm from the stowed state to a deployed state in which the engagement surface is exposed. The engagement surface is configured to hold the aircraft component in place when the latch arm is in the deployed state. In this aspect, additionally or alternatively, the aircraft component is an internal window panel or a door and the engagement surface is configured to hold the internal window panel or the door in an open position. In this aspect, additionally or alternatively, the turret assembly includes a first cartridge having a protrusion or recess configured to restrict vertical movement and lateral movement and permit rotational movement, about the rotational axis, of the first cartridge, and the turret assembly includes a second cartridge inserted into the first cartridge, the second cartridge being fixedly connected to the latch arm. In this aspect, additionally or alternatively, the engagement surface is positioned on an underside of the distal end of the latch arm and contacts a top surface of a portion of the aircraft component when the latch arm is in the deployed state to hold the aircraft component in place.

Another aspect provides a method of assembling a latch assembly. The method includes assembling a turret assembly by nesting a first cartridge, a second cartridge inside the first cartridge, and third cartridge inside the second cartridge, mounting the turret assembly in a housing, and fixedly attaching a latch arm to the second cartridge, the latch arm being configured to receive a pushing force in a stowed state to be depressed a predetermined distance along a rotational axis, then rotate about the rotational axis and rise to thereby transition to a deployed state. In this aspect, additionally or alternatively, the method further comprises positioning a first spring underneath the third cartridge to provide an upward force. In this aspect, additionally or alternatively, the method further comprises connecting a second spring to the housing and the first cartridge to provide a rotational force about the rotational axis.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems, and configurations, and other features, functions, acts, and/or properties disclosed herein, as well as any and all equivalents thereof.

The invention claimed is:

1. A latch assembly, comprising:
   a latch arm having a rotational axis and an engagement surface on a distal end of the latch arm a length from the rotational axis, the engagement surface being stowed relative to a surrounding structure in a stowed state of the latch arm, the latch arm being configured to receive a pushing force to depress the latch arm a predetermined distance along the rotational axis; and
   a turret assembly having a top end with the latch arm mounted thereon and including a first cartridge, a second cartridge inserted into the first cartridge, and a third cartridge inserted into the second cartridge and upon which the second cartridge rests, the first cartridge having teeth that directly engage with teeth of the third cartridge, wherein
   the turret assembly is configured to, in response to the pushing force being applied to the latch arm, raise and rotate the latch arm about the rotational axis to thereby transition the latch arm from the stowed state to a deployed state in which the engagement surface is exposed.

2. The latch assembly according to claim 1, wherein the first cartridge includes a protrusion configured to restrict vertical movement and lateral movement and permit rotational movement, about the rotational axis, of the first cartridge.

3. The latch assembly according to claim 1, wherein the second cartridge is fixedly connected to the latch arm.

4. The latch assembly according to claim 1, wherein
   the teeth of the third cartridge are outward-facing teeth and the teeth of the first cartridge are downward-facing teeth, and
   the downward-facing teeth are configured to engage with the outward-facing teeth to thereby restrict upward movement of the third cartridge when the latch arm is in the stowed state.

5. The latch assembly according to claim 4, wherein in response to the latch arm receiving the pushing force while in the stowed state:
   the latch arm and the second cartridge are configured to move downward and push the third cartridge downward;
   a first spring positioned beneath the third cartridge is configured to be compressed by the third cartridge; and
   the outward-facing teeth of the third cartridge are configured to vertically clear the downward-facing teeth of the first cartridge.

6. The latch assembly according to claim 4, wherein in response to the pushing force being released:
   a first spring is configured to expand while the outward-facing teeth of the third cartridge move along slopes of the downward-facing teeth of the first cartridge, thereby raising and rotating the third cartridge about a rotational axis;
   the outward-facing teeth of the third cartridge are configured to enter first vertical slots on an inner surface of the first cartridge which allow the third cartridge to continue to rise as the first spring further expands; and
   the third cartridge is configured to push up the second cartridge with outward-facing teeth of the second cartridge engaging second vertical slots of the first cartridge, the second cartridge pushing up the latch arm.

7. The latch assembly according to claim 1, further comprising a spring connected to an outer surface of the first cartridge, the spring configured to be compressed in the stowed state and expand to rotate the turret assembly and the latch arm when the latch arm transitions from the stowed state to the deployed state.

8. The latch assembly according to claim 1, further comprising a housing surrounding the latch arm and the turret assembly, the housing configured to restrict rotational movement of the latch arm in the stowed state.

9. The latch assembly according to claim 8, wherein
   the housing is integral with a panel, the latch assembly embedded into the panel, and
   the latch arm is substantially flush with the panel in the stowed state.

10. The latch assembly according to claim 1, wherein the engagement surface is positioned on an underside of the distal end of the latch arm.

11. The latch assembly according to claim 1, wherein the latch assembly is embedded into an aircraft panel having an openable aircraft component, and the engagement surface is configured to hold the aircraft component in place when the latch arm is in the deployed state.

12. The latch assembly according to claim 11, wherein the aircraft component is an internal window panel and the engagement surface is configured to hold the internal window panel in an open position.

13. The latch assembly according to claim 11, wherein the aircraft component is a door.

14. An aircraft component latching system, comprising:
   an openable aircraft component mounted in an aircraft panel; and
   a latch assembly embedded into the aircraft panel, the latch assembly including:
     a latch arm having a rotational axis and an engagement surface positioned on an underside of a distal end of the latch arm that is stowed in the aircraft panel in a stowed state of the latch arm, the latch arm being configured to receive a pushing force to depress the latch arm a predetermined distance, the pushing force being a downward force into the aircraft panel parallel to the rotational axis; and
     a turret assembly having a top end with the latch arm mounted thereon and including a first cartridge, a second cartridge inserted into the first cartridge, and a third cartridge inserted into the second cartridge and upon which the second cartridge rests, the first cartridge having teeth that directly engage with teeth of the third cartridge, wherein
   the turret assembly is configured to, in response to the pushing force being applied to the latch arm, raise and rotate the latch arm about the rotational axis to thereby transition the latch arm from the stowed state to a deployed state in which the engagement surface is exposed, and
   the engagement surface is configured to hold the aircraft component in place when the latch arm is in the deployed state.

15. The aircraft component latching system according to claim 14, wherein the aircraft component is an internal window panel or a door and the engagement surface is configured to hold the internal window panel or the door in an open position.

16. The aircraft component latching system according to claim 14, wherein
the first cartridge includes a protrusion or recess configured to restrict vertical movement and lateral movement and permit rotational movement, about the rotational axis, of the first cartridge; and
the second cartridge is fixedly connected to the latch arm.

17. The aircraft component latching system according to claim 16, wherein the engagement surface is configured to contact a top surface of a portion of the aircraft component when the latch arm is in the deployed state to hold the aircraft component in place.

18. A method of assembling a latch assembly, comprising:
assembling a turret assembly by nesting a first cartridge, a second cartridge inside the first cartridge, and third cartridge inside the second cartridge, and resting the second cartridge upon the third cartridge, the first cartridge having teeth that directly engage with teeth of the third cartridge;
mounting the turret assembly in a housing; and
fixedly attaching a latch arm to the second cartridge, the latch arm being configured to receive a pushing force in a stowed state to be depressed a predetermined distance along a rotational axis, then rotate about the rotational axis and rise to thereby transition to a deployed state.

19. The method of assembling the latch assembly of claim 18, further comprising:
positioning a first spring underneath the third cartridge to provide an upward force.

20. The method of assembling the latch assembly of claim 18, further comprising:
connecting a second spring to the housing and the first cartridge to provide a rotational force about the rotational axis.

* * * * *